(12) United States Patent
Huang et al.

(10) Patent No.: US 12,435,723 B2
(45) Date of Patent: *Oct. 7, 2025

(54) FLUID TRANSFER PUMP

(71) Applicant: TECHTRONIC CORDLESS GP, Anderson, SC (US)

(72) Inventors: Jiabin Huang, Dongguan (CN); Xijun Jiang, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,469

(22) Filed: Apr. 16, 2024

(65) Prior Publication Data

US 2024/0263633 A1    Aug. 8, 2024

Related U.S. Application Data

(63) Continuation of application No. 17/877,299, filed on Jul. 29, 2022, now Pat. No. 11,988,212.

(30) Foreign Application Priority Data

Aug. 2, 2021 (CN) .......................... 202121777240.4

(51) Int. Cl.
*F04D 13/06* (2006.01)
*F04B 17/03* (2006.01)
(Continued)

(52) U.S. Cl.
CPC ............ *F04D 13/068* (2013.01); *F04B 17/03* (2013.01); *F04B 35/04* (2013.01); *F04B 35/06* (2013.01);
(Continued)

(58) Field of Classification Search
CPC .......... F04B 35/04; F04B 35/06; F04B 17/03; F04B 39/121; F04B 49/06; F04C 5/00;
(Continued)

(56) References Cited

U.S. PATENT DOCUMENTS

| 3,173,584 A | 3/1965 | Giavasis |
| 4,380,091 A | 4/1983 | Lively |

(Continued)

FOREIGN PATENT DOCUMENTS

| AU | 197249756 | 4/1974 |
| CA | 2925164 | 3/2015 |

(Continued)

*Primary Examiner* — Peter J Bertheaud
(74) *Attorney, Agent, or Firm* — Dority & Manning, P.A.

(57) ABSTRACT

A fluid transfer pump comprises: a housing, a pump unit, an electric motor assembly, a power supply mounting base, and a speed change mechanism, wherein the pump unit comprises an impeller; the electric motor assembly is used to drive the impeller to rotate around an axis of the impeller; the power supply mounting base is used to receive a power supply for supplying electricity to the pump unit; and the speed change mechanism is arranged between the pump unit and the electric motor assembly. The power supply mounting base is arranged in a power supply compartment; and the pump unit, the speed change mechanism, the electric motor assembly, and the power supply compartment are successively arrayed in an extension direction of the axis of the impeller.

20 Claims, 11 Drawing Sheets

(51) Int. Cl.
*F04B 35/04* (2006.01)
*F04B 35/06* (2006.01)
*F04B 39/12* (2006.01)
*F04B 49/06* (2006.01)
*F04C 5/00* (2006.01)
*F04C 11/00* (2006.01)
*F04C 15/00* (2006.01)

(52) U.S. Cl.
CPC ............ *F04B 39/121* (2013.01); *F04B 49/06* (2013.01); *F04C 5/00* (2013.01); *F04C 11/008* (2013.01); *F04C 15/00* (2013.01); *F04D 13/06* (2013.01)

(58) Field of Classification Search
CPC ...... F04C 11/008; F04C 15/00; F04D 13/068; F04D 13/06
See application file for complete search history.

(56) References Cited

U.S. PATENT DOCUMENTS

| | | | |
|---|---|---|---|
| 4,514,991 A * | 5/1985 | Zinsmeyer | F16H 3/72 475/2 |
| 4,724,817 A | 2/1988 | Cook | |
| 4,875,497 A | 10/1989 | Worthington | |
| 5,404,048 A | 4/1995 | Panner | |
| 6,227,808 B1 | 5/2001 | McDonough | |
| 6,390,780 B1 | 5/2002 | Batchelder et al. | |
| 6,547,529 B2 | 4/2003 | Gross | |
| 6,666,086 B2 | 12/2003 | Colman et al. | |
| 8,380,355 B2 | 2/2013 | Mayleben et al. | |
| 8,602,744 B2 | 12/2013 | Ward | |
| 8,684,700 B2 | 4/2014 | Carson-Rowland | |
| 8,864,476 B2 | 10/2014 | Moormann et al. | |
| 8,894,389 B2 | 11/2014 | Meza et al. | |
| D788,180 S | 5/2017 | Mantes et al. | |
| 9,739,280 B2 | 8/2017 | Chikaoka | |
| 9,745,974 B2 | 8/2017 | Phillips et al. | |
| 9,920,765 B2 | 3/2018 | Zimmerman | |
| 10,017,399 B2 | 7/2018 | Kamen et al. | |
| 10,024,325 B2 | 7/2018 | Phillips et al. | |
| 10,337,513 B2 | 7/2019 | Reul et al. | |
| 10,584,792 B2 | 3/2020 | Ammler | |
| 10,711,788 B2 | 7/2020 | Mayleben | |
| 10,760,938 B2 | 9/2020 | Newman et al. | |
| 10,907,638 B2 | 2/2021 | Wilds et al. | |
| 10,927,829 B2 | 2/2021 | Beard et al. | |
| 11,054,297 B2 | 7/2021 | Durfee et al. | |
| 2003/0106582 A1 | 6/2003 | Jeong | |
| 2005/0232796 A1 | 10/2005 | Pohler | |
| 2007/0224050 A1 | 9/2007 | Ward | |
| 2011/0110792 A1 | 5/2011 | Mauro et al. | |
| 2014/0158225 A1 | 6/2014 | McBride | |
| 2017/0204864 A1 | 7/2017 | Mantes et al. | |
| 2019/0101427 A1 | 4/2019 | Beger et al. | |
| 2020/0003217 A1 | 1/2020 | Wilds | |
| 2020/0093343 A1 | 3/2020 | Quintero et al. | |
| 2021/0140433 A1 | 5/2021 | Humer et al. | |

FOREIGN PATENT DOCUMENTS

| | | |
|---|---|---|
| CN | 2752492 | 1/2006 |
| CN | 200993107 | 12/2007 |
| CN | 201041162 | 3/2008 |
| CN | 201165986 | 12/2008 |
| CN | 105864056 | 8/2016 |
| CN | 206668579 | 11/2017 |
| CN | 206708105 | 12/2017 |
| CN | 108240341 | 7/2018 |
| CN | 109083844 | 12/2018 |
| CN | 109209926 | 1/2019 |
| CN | 109340134 | 2/2019 |
| CN | 109372790 | 2/2019 |
| CN | 208565008 | 3/2019 |
| CN | 110080991 | 8/2019 |
| CN | 210738820 | 6/2020 |
| CN | 211039051 | 7/2020 |
| CN | 111779681 | 10/2020 |
| CN | 212177438 | 12/2020 |
| CN | 112283123 | 2/2021 |
| CN | 112360677 | 2/2021 |
| CN | 112412737 | 2/2021 |
| CN | 212744372 | 3/2021 |
| CN | 112922848 | 6/2021 |
| CN | 112963360 | 6/2021 |
| CN | 213331717 | 6/2021 |
| EP | 3746660 | 12/2020 |
| GB | 1360478 A | 7/1974 |
| GB | 2168153 | 6/1986 |
| GB | 2574299 | 12/2019 |
| WO | WO2018103669 A1 | 6/2018 |
| WO | WO2021107906 A1 | 6/2021 |

* cited by examiner

FLUID TRANSFER PUMP

This application is a continuation application of U.S. patent application Ser. No. 17/877,299, filed Jul. 29, 2022, and claims the benefit of priority to Chinese Patent Application No. 202121777240.4, filed on Aug. 2, 2021, the disclosures of both of which are incorporated by reference herein in their entireties.

TECHNICAL FIELD

The present disclosure relates to a fluid transfer pump, in particular to a portable fluid transfer pump driven by an electric motor.

BACKGROUND ART

A fluid transfer pump driven by an electric motor transfers water or other fluids from one position to another by means of a pump unit. An inlet of the pump can be connected to a fluid source such as a water pool via an input pipe. An outlet of the pump can be connected to a discharge pipe such as a standard garden hose to transfer a discharged fluid to a desired position. A type of fluid transfer pump performs the suction and discharge of the fluid by the rotation of an impeller.

The fluid transfer pump is typically connected to a power supply through an electric wire. In recent years, a battery-powered fluid transfer pump is emerging. The battery-powered fluid transfer pump is popular with users due to its portability. However, this cordless pump has some shortcomings, such as a large size, a heavy weight, a complex structure, a short battery life, and a low heat dissipation efficiency of the electric motor.

Thus, it is necessary to develop a portable fluid transfer pump having a compact structure, with ease of assembly, a prolonged battery life, and improved heat dissipation performance.

SUMMARY OF THE DISCLOSURE

To achieve the above objective, the present disclosure provides a fluid transfer pump. The fluid transfer pump comprises: a housing, a pump unit, an electric motor assembly, a power supply mounting base, and a speed change mechanism, wherein the pump unit comprises an impeller; the electric motor assembly is used to drive the impeller to rotate around an axis of the impeller; the power supply mounting base is used to receive a power supply for supplying electricity to the pump unit; and the speed change mechanism is arranged between the pump unit and the electric motor assembly.

Preferably, the power supply mounting base is arranged in a power supply compartment; the pump unit, the speed change mechanism, the electric motor assembly, and the power supply compartment are successively arrayed in an extension direction of the axis of the impeller; and the power supply can be guided into the power supply compartment in a mounting direction. Viewed from a side, an axis in the mounting direction is inclined at an angle relative to the axis of the impeller.

The speed change mechanism can be used to reduce an output rotation speed of the electric motor assembly. Preferably, the speed change mechanism can comprise a gearbox shell as well as a gear and a ring gear which are meshed with each other and accommodated in the gearbox shell; and the gear is in drive connection with an output shaft of the electric motor assembly, and the ring gear is in drive connection with a drive shaft of the impeller. In one embodiment, the ring gear comprises a main ring gear body on which inner teeth are formed as well as a ring gear extension part extending axially from the main ring gear body, and the ring gear extension part matches the drive shaft of the impeller. A first bearing can be disposed around the ring gear extension part. The ring gear can comprise a ring gear shaft which defines a rotational axis of the ring gear; a bearing seat is formed in the ring gear; and a second bearing disposed around the ring gear shaft is accommodated in the bearing seat. The ring gear can comprise a transition part connecting the main ring gear body to the ring gear extension part, and at least one part of the bearing seat is formed in the transition part. The gearbox shell can be fixed to a mounting flange located at one end of the housing of the pump unit.

In one aspect, the power supply compartment can comprise a compartment shell and a cover pivotally connected to the compartment shell; the cover has a first sealing edge, and the compartment shell has a second sealing edge aligned to the first sealing edge; and a groove used to accommodate at least one part of a sealing component is formed in at least one of the first sealing edge and the second sealing edge. Preferably, at least one of the first sealing edge and the second sealing edge has a ridge part extending outward; and when the cover is in a closed position, the ridge part abuts against the sealing component.

In one aspect, the fluid transfer pump can comprise a locking component used to lock the cover in the closed position; the locking component is able to move between a locked position and an unlocked position; and when the locking component is in the locked position, at least one part of the locking component presses against the first sealing edge of the cover. Preferably, the compartment shell comprises a protrusion part extending from the second sealing edge, the locking component is held on the protrusion part through a biasing component, and the biasing component applies a biasing force to the locking component to resist movement of the locking component away from the protrusion part.

In one aspect, an internal space of the housing can be divided into a plurality of areas by at least one separator; the electric motor assembly comprises an electric motor, and a fan driven by the electric motor and adjacent to one end of the electric motor; and the fan and the other end of the electric motor are respectively located in different areas. Preferably, the fan is located in a first area, the first area is at least partially defined by a first wall part of the housing, and a first opening is formed in the first wall part such that the first area communicates with an external environment. Preferably, the first opening is radially aligned to the fan. The other end of the electric motor is located in a second area, the second area is at least partially defined by a second wall part of the housing, and a second opening is formed in the second wall part such that the second area communicates with the external environment. Preferably, the second opening is located above the electric motor. The first area and the second area are separated by a first partition plate extending from an inner wall of the housing, and the first partition plate is in a close fit with a first sealing ring disposed around the electric motor assembly. The pump unit is located in a third area, and the third area and the first area are separated by a second partition plate extending from the inner wall of the housing. The second partition plate is in a close fit with the second sealing ring disposed around the gearbox shell.

In one aspect, the fluid transfer pump can comprise a base; the base has support parts and an elevation part elevated relative to bottom surfaces of the support parts; and a hole via which an internal space of the housing communicates with the external environment is formed in at least one of the support parts and the elevation part. Preferably, the elevation part is located below the electric motor assembly, the elevation part comprises a bottom wall and a baffle plate located on an inner side of the bottom wall, the hole is formed in the bottom wall, and a tortuous path from the hole to the internal space of the housing is defined by the baffle plate.

DETAILED DESCRIPTION OF EMBODIMENTS

Figure 1:
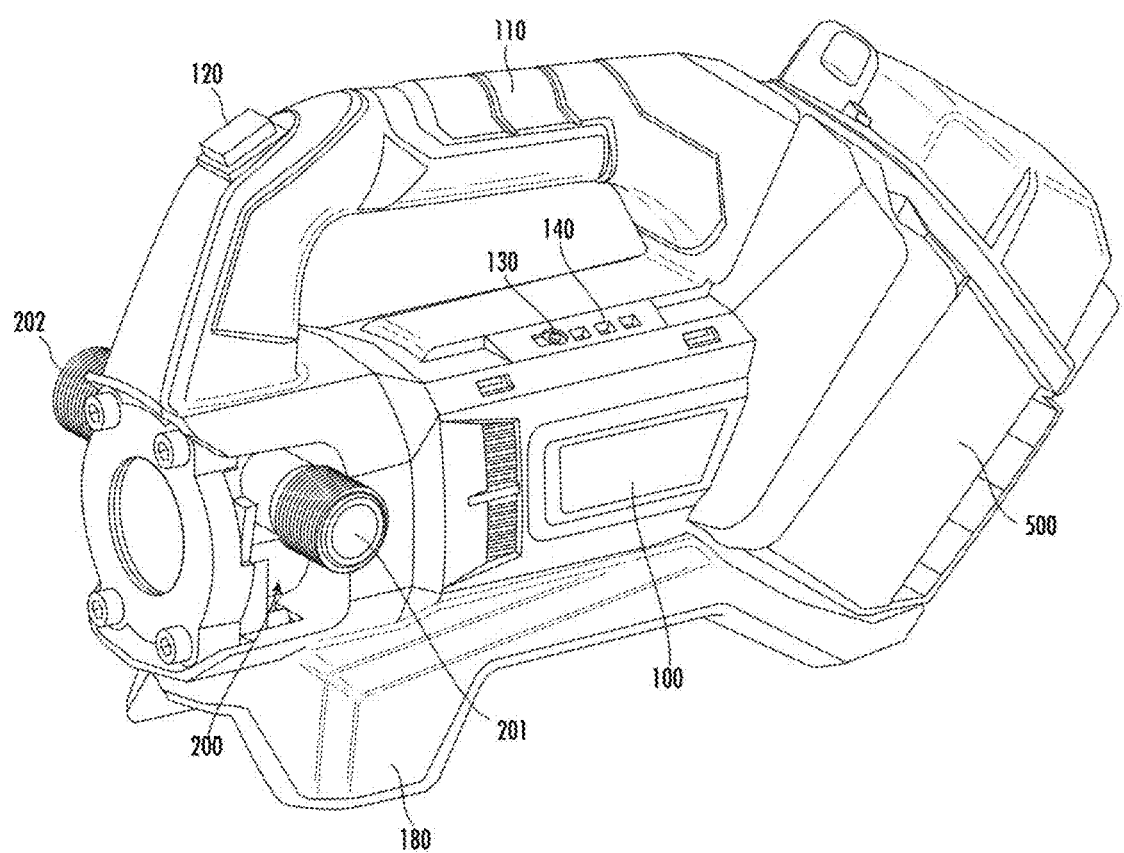
FIG. 1 shows a fluid transfer pump according to an embodiment of the present disclosure.

FIG. 1 shows a fluid transfer pump, which is used to pump a fluid such as water, according to an embodiment of the present disclosure. The fluid transfer pump comprises a housing 100 and a pump unit 200 accommodated in the housing 100. The pump unit comprises a fluid inlet 201 used to be connected to an input pipe and a fluid outlet 202 used to be connected to a discharge pipe. In this embodiment, the pump unit 200 is arranged at a front part (a left side in FIG. 1) of the housing 100, and the fluid inlet 201 and the fluid outlet 202 respectively extend from two sides of the housing 100. In other embodiments, the pump unit 200 may be arranged at other positions in the housing. The fluid inlet 201 and the fluid outlet 202 may be arranged in an upper side, a front end, or a rear end of the housing. A base 180 stably supports the fluid transfer pump on the ground or other supporting surfaces. The base 180 can be integrated with the housing 100 or be independent of the housing.

The fluid transfer pump shown in FIG. 1 can be powered by a portable power supply. The portable power supply can be a lithium battery and is removably mounted on the fluid transfer pump. In the illustrated embodiment, the fluid transfer pump comprises a power supply compartment 500 located at a rear part (a right side in FIG. 1) of the housing 100, and a power supply for supplying electricity to the pump unit 200 is accommodated in the power supply compartment 500. The fluid transfer pump further comprises a handle 110 for a user to grasp. The handle 110 can be located above the housing 100 and connected to the front part and rear part of the housing 100. As shown in FIG. 1, one end of the handle 110 is adjacent to the fluid inlet 201 and the fluid outlet 202, and the other end of the handle is adjacent to the power supply compartment 500.

The handle 110 can be integrated with the housing 100 or be mounted on the housing 100 as an independent component. The handle 110 comprises a grasping part, the size and contour of which conform to a palm of the user. The grasping part can be covered with an elastic material such as rubber, which is deformable when the grasping part is grasped by the user, so as to improve grasping comfort. At least one part of the grasping part can be covered with pits or ridges to prevent the handle from slipping out of a hand of the user. Preferably, when the fluid transfer pump is put onto the ground, the grasping part of the handle 110 intersects a vertical line passing through the center of gravity of the whole fluid transfer pump. The position of the grasping part is conducive to saving the force required by the user to lift the fluid transfer pump and relieving shaking of the fluid transfer pump during movement.

An operating unit used to control the fluid transfer pump can be arranged on the handle 110. FIG. 1 shows a button 120. The button is located at a front part of the handle 110, such that a thumb of the user can naturally touch the button 120 when the user grasps the handle 110. In addition, a control key 130 and a status indicator 140 can be arranged on the housing 100. In an embodiment, the button 120 is used to start and stop the fluid transfer pump, and the control key 130 allows the user to adjust the power and/or speed of an electric motor, or to set an operating time of the electric motor. The state indicator 140 can include a plurality of LED lights 140 or other types of display devices which are used to display the current power and/or speed level, or continuous operating time and remaining operating time of the pump unit, and other information. In other embodiments, the handle 110 and/or the housing 100 may be provided with a control and display unit such as a locking button, a pumping mode switching button, a timer button, and an electronic display screen to assist the user in operating the fluid transfer pump.

Figure 2:
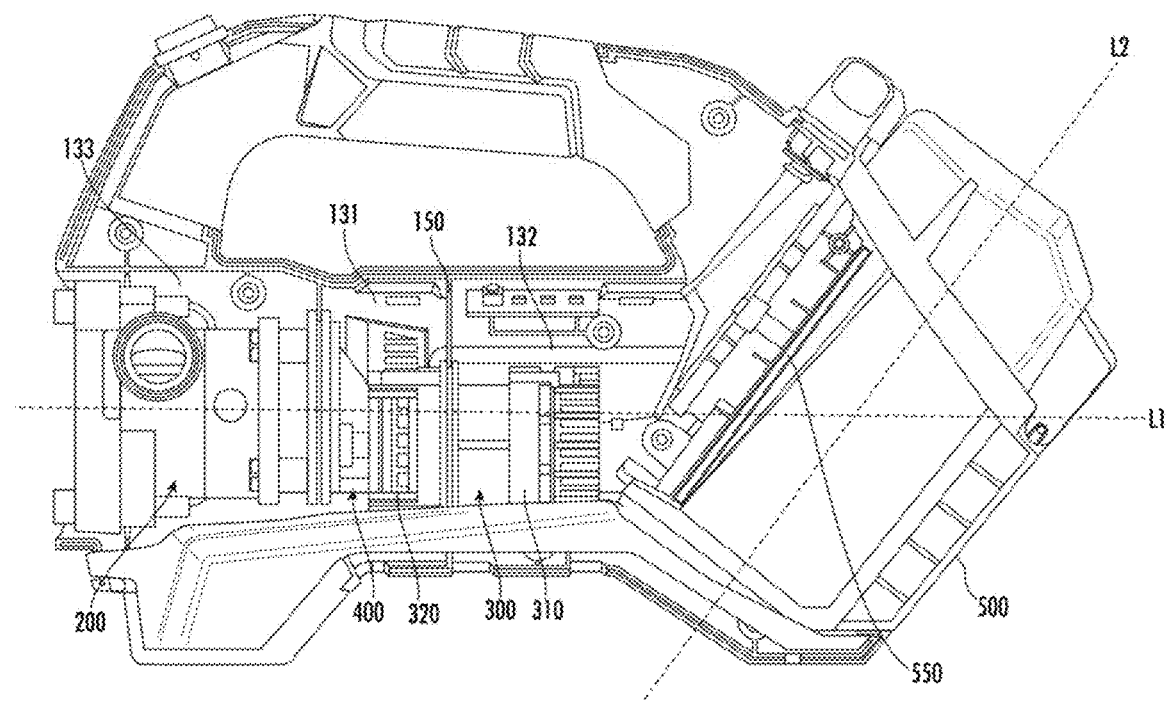
FIG. 2 shows an internal structure of the fluid transfer pump.

FIG. 2 shows one side of the fluid transfer pump. In this embodiment, the housing 100 is formed by assembling two half housings. In order to clearly show an internal structure, one of the half housings has been removed. The pump unit 200 and the power supply compartment 500 are respectively located on two sides of the housing 100, and an electric motor assembly 300 used to drive the pump unit 200 to operate is located between the pump unit 200 and the power supply compartment 500 and is approximately in the middle of the whole housing 100. Such a configuration can enable the power supply compartment 500 to be furthest away from a fluid source. A speed change mechanism 400 is arranged between the pump unit 200 and the electric motor assembly 300, and is used to change an output rotation speed of the electric motor assembly 300. An impeller in the pump unit 200 is in drive connection with an output end of the speed change mechanism 400, and is driven by the electric motor assembly 300 and the speed change mechanism 400 to rotate along an axis L1 of the impeller. It can be seen from FIG. 2 that the pump unit 200, the speed change mechanism 400, the electric motor assembly 300, and the power supply compartment 500 are successively arrayed in an extension direction of the axis L1 of the impeller.

A power supply mounting base 550 is arranged in the power supply compartment 500 to receive the power supply for supplying the electricity to the pump unit 200, such as a battery pack capable of being repeatedly recharged. The battery pack can be guided into the power supply compartment 500 in a mounting direction. An axis L2 in the mounting direction is inclined at an angle relative to the axis L1 of the impeller. In the embodiment shown in FIG. 2, this angle is less than 90°, preferably between 15° and 75°, and more preferably between 30° and 60°. The power supply compartment 500 is obliquely arranged to make the most of an internal space of the housing 100, enable the power supply mounting base 550 to be closer to the electric motor assembly 300, and make it convenient for the user to install and remove the power supply. In other embodiments, in order to further reduce the size of the fluid transfer pump, the housing 100 is not provided with the power supply compartment 500, and the power supply mounting base 550 may be arranged on an outer surface of the housing, such as a top surface or a side surface. In these embodiments, the battery pack is directly mounted on the outer surface of the housing 100. In other embodiments, a separate power supply box may be provided and electrically connected to the pump unit 200.

Figure 3:
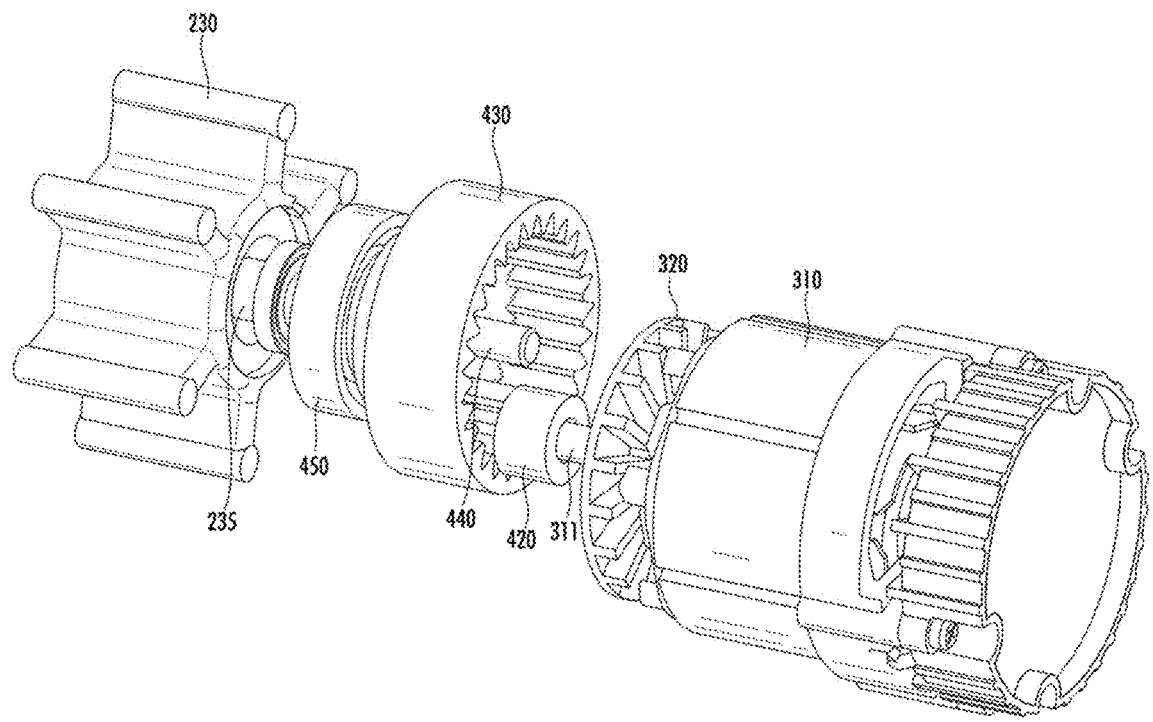
FIG. 3 shows a speed change mechanism, a part of a pump unit, and a part of an electric motor assembly of the fluid transfer pump.

FIG. 3 shows the speed change mechanism 400, a part of the pump unit 200 in drive connection with the speed change mechanism, and a part of the electric motor assembly 300 in drive connection with the speed change mechanism. In this embodiment, the speed change mechanism 400 comprises a gearbox shell 410 (shown in FIG. 10) as well as a gear 420 and a ring gear 430 which are meshed with each other and accommodated in the gearbox shell. The gear 420 is in drive connection with an output shaft 311 of the electric motor assembly 300, and the ring gear 430 is in drive connection with a drive shaft 235 of an impeller 230.

Figure 4:
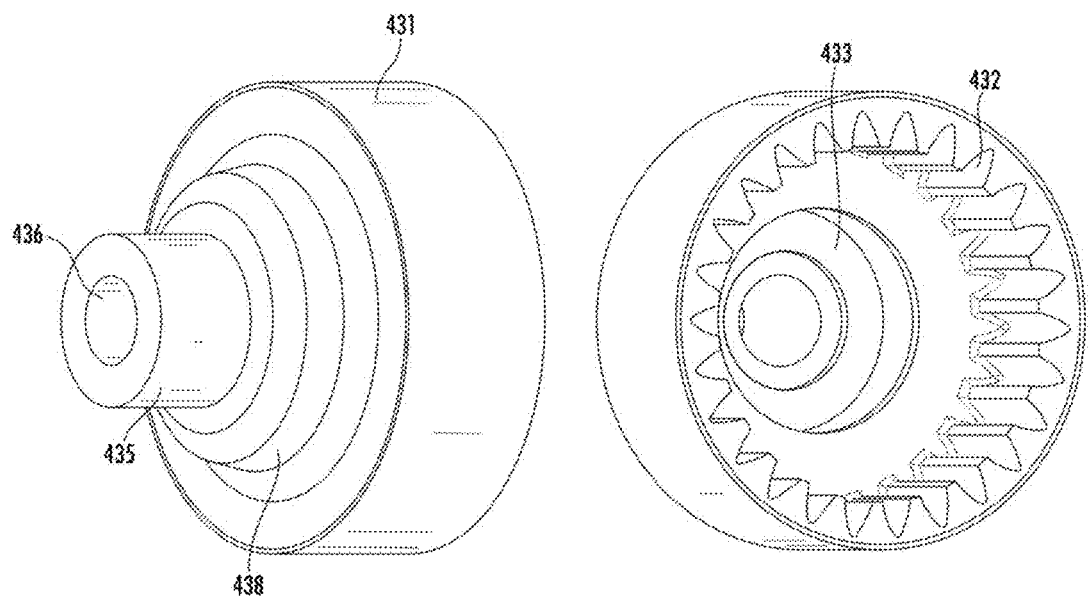
FIG. 4 shows a ring gear of the speed change mechanism.

FIG. 4 shows the ring gear 430. The ring gear comprises a main ring gear body 431 on which inner teeth 432 are formed as well as a ring gear extension part 435 extending axially from the main ring gear body 431. The ring gear extension part 435 and the drive shaft 235 of the impeller cooperate in such a way that they are unable to rotate relative to each other. For example, a shaft hole 436 formed in the ring gear extension part 435 can be in bonded connection, welded connection, clamped connection or threaded connection with the drive shaft 235. Alternatively, a contour of an inner wall of the shaft hole 436 and a contour of the drive shaft 235 can be formed to match each other, such as planar contours.

FIG. 3 shows a first bearing 450. The first bearing is disposed around the ring gear extension part 435, and an outer side of the first bearing 450 abuts against a main pump body 210 (see FIG. 9). FIG. 3 also shows a ring gear shaft 440. The ring gear shaft defines a rotation axis of the ring gear 430. FIG. 4 shows a bearing seat 433. The bearing seat 433 is formed inside the ring gear 430 to accommodate a second bearing 460 (see FIG. 9) disposed around the ring gear shaft 440. The ring gear 430 further comprises a transition part 438 connecting the main ring gear body 431 to the ring gear extension part 435, and at least one part of the bearing seat 433 is formed in the transition part 438. The first bearing 450 and the second bearing 460 are respectively located outside and inside the ring gear 430, and are spaced axially. During operation of the pump unit 200, the first bearing 450 and the second bearing 460 respectively support the rotating ring gear 430 from the outside and the inside to avoid deviation of the rotation axis of ring gear 430.

The speed change mechanism 400 in this embodiment is used to reduce the output rotation speed of the electric motor assembly 300. Technical personnel can understand that speed reduction mechanisms in other forms are also applicable to the present disclosure, such as a planetary gear train, a worm gear, and a reduction gear train composed of a plurality of meshing spur gears and bevel gears, or their combination. A reduction ratio of the speed change mechanism is preferably 2:1 to 10:1, and is more preferably 2.5:1 to 5:1, such as 3:1, 22:7, 26:7, and 4:1. In other embodiments, the speed change mechanism 400 may comprise a multistage reduction gear to raise the reduction ratio. The speed change mechanism 400 can reduce a rotation speed of the electric motor to be equal to a desired rotation speed of the impeller, so that the service life of the impeller is prolonged. Furthermore, the fluid transfer pump of the present disclosure can use a small DC high-speed electric motor due to the existence of the speed change mechanism 400. This is conducive to reducing the size of the fluid transfer pump, decreasing energy consumption, and increasing battery life.

Figure 5:
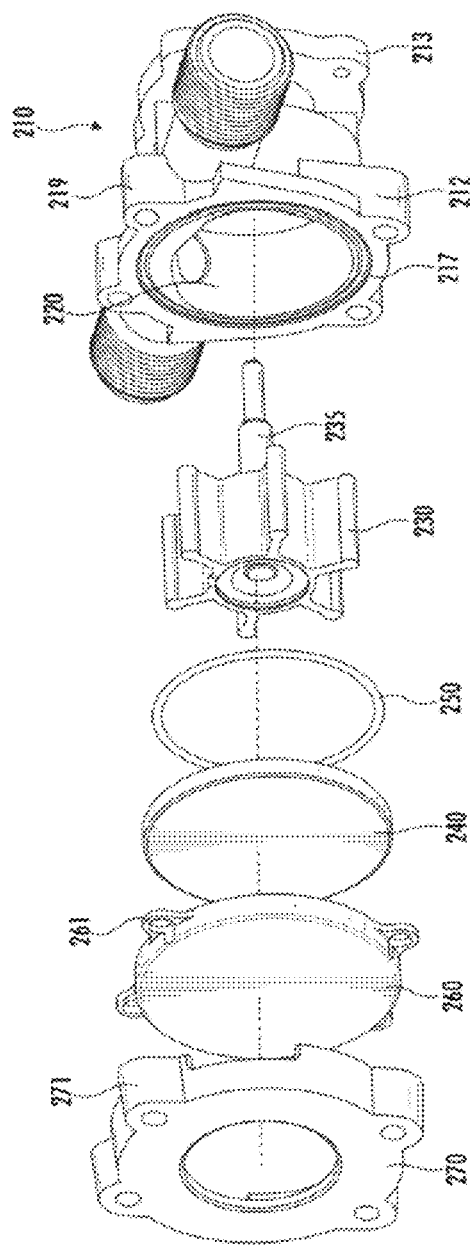
FIG. 5 shows a pump unit according to an embodiment of the present disclosure.

FIG. 5 shows the pump unit 200 according to an embodiment of the present disclosure. The pump unit comprises the main pump body 210 and the impeller 230. The main pump body 210 defines a pump chamber 220, and the impeller 230 is arranged in the pump chamber 220. The impeller 230 comprises the drive shaft 235 in drive connection with the output end of the speed change mechanism 400. In this embodiment, the drive shaft 235 is in drive connection with the ring gear extension part 435 of the ring gear 430. A mounting flange 213 is formed at a rear end of the main pump body 210, and the gearbox shell 410 (see FIG. 10) can be fixed to the mounting flange 213. An annular groove 217 is formed in an outer surface of a front end 212 of the main pump body 210, and a sealing ring 250 is accommodated in the annular groove. The pump unit 200 further comprises a cover plate 260 and a mounting base 270 supporting the cover plate 260. The cover plate 260 is used to close the pump chamber 220, and the mounting base 270 is connected to the housing 100 of the fluid transfer pump. Optionally, a sealing plate 240 is additionally arranged between the cover plate 260 and the main pump body 210. In addition, fastener holes 271, 261, 219 which are aligned axially can be formed in edges of the mounting base 270, the cover plate 260, and the main pump body 210, facilitating assembly and disassembly of the pump unit 200.

Figure 6:
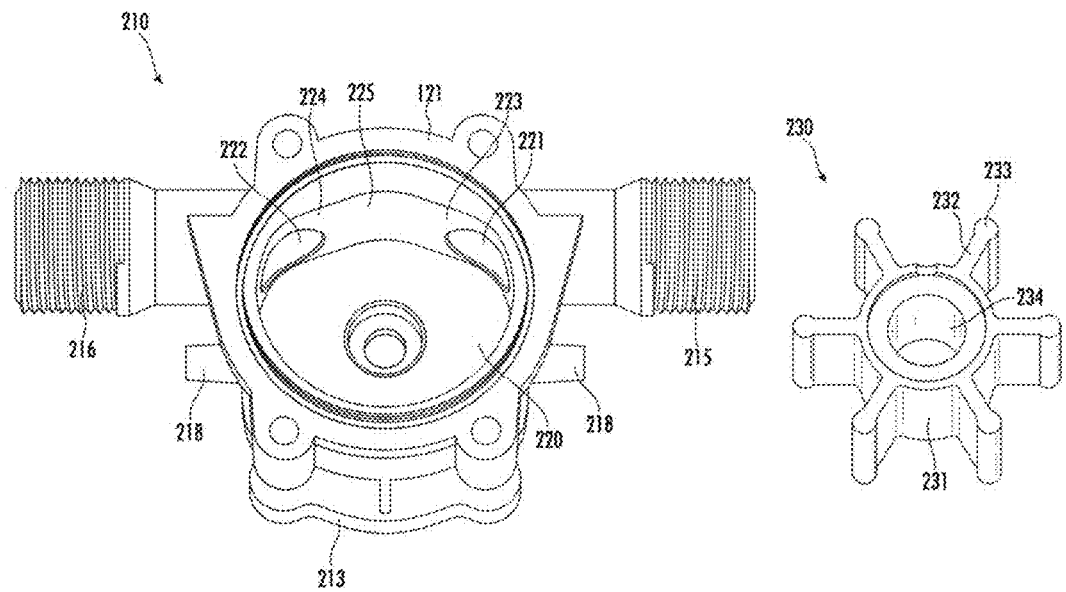
FIG. 6 shows a main pump body of the pump unit and an impeller.

FIG. 6 shows the main pump body 210 and the impeller 230. Close nipples 215, 216 extend outward from the main pump body 210 in a direction transverse to the axis of the impeller, so as to form the fluid inlet 201 and fluid outlet 202 of the fluid transfer pump. The impeller 230 comprises a hub 231 and a plurality of flexible blades 232 radially extending outward from the hub 231 and spaced from one another in a circumferential direction. A hole 234 is formed in the center of the hub 231 to receive the drive shaft 235 such that the impeller 230 rotates together with the drive shaft 235. Optionally, each flexible blade 232 has a roughly cylindrical outer end part 233.

Figure 7:
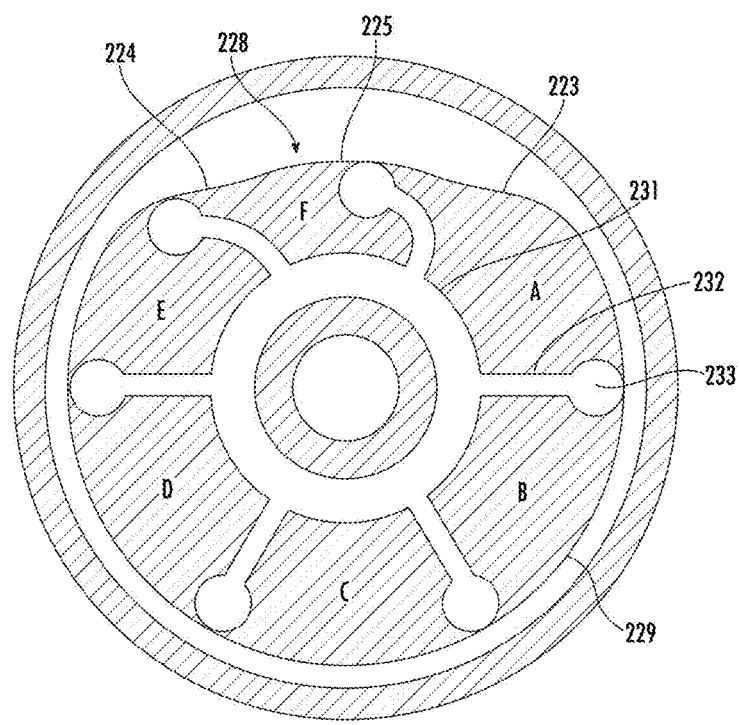
FIG. 7 shows a cross section of the pump unit.

FIG. 7 shows a cross section of the pump unit 200. A wall defining the pump chamber 220 comprises a cam-shaped wall portion 228 and a circular wall portion 229. With reference to FIG. 6 and FIG. 7, it can be seen that the cam-shaped wall portion 228 comprises a first arc part 223 defining a pump inlet 221, a second arc part 224 defining a pump outlet 222, and a third arc part 225 connected to the first arc part 223 and the second arc part 224. In this embodiment, the radius of curvature of the first arc part 223, the radius of curvature of the second arc part 224, and the radius of curvature of the third arc part 225 are all smaller than the radius of curvature of the circular wall portion 229. When the impeller 230 rotates in the pump chamber 220, the outer end part 233 of the flexible blade 232 is in sliding contact with the cam-shaped wall portion 228 or the circular wall portion 229. When in sliding contact with the cam-shaped wall portion 228, the flexible blade 232 is obviously deformed due to extrusion of the first arc part 223, the second arc part 224, and the third arc part 225.

In this embodiment, the impeller 230 has six flexible blades 232. As shown in FIG. 7, when the impeller 230 is put into the pump chamber 220, an adjacent two of the flexible blades 232, an outer wall of the hub 231, and the wall defining the pump chamber 220 jointly define a fluid delivery cavity. In other words, the pump chamber 220 is divided into six fluid delivery cavities A-F by the impeller 230. In FIG. 7, the two flexible blades 232 in contact with the cam-shaped wall portion 228 (the first arc part 223, the second arc part 224, and the third arc part 225) are significantly deformed, and the four flexible blades 232 in contact with the circular wall portion 229 are not deformed or merely slightly deformed. When the impeller 230 rotates clockwise, the deformed flexible blades 232 induce a size reduction and pressure rise of the fluid delivery cavities E, F, such that a fluid is forced to flow out via the pump outlet 222 formed in the second arc part 224. At the same time, a negative pressure is generated in the fluid delivery cavity A, such that liquid is sucked into the pump chamber 220 via the pump inlet 221 formed in the first arc part 223. It should be understood that a pumping path of the fluid is related to a rotation direction of the impeller 230. If the impeller 230 is driven by the electric motor assembly 300 to rotate counterclockwise, the liquid enters the pump chamber 220 via the pump outlet 222 and is discharged via the pump inlet 221.

Figure 8:
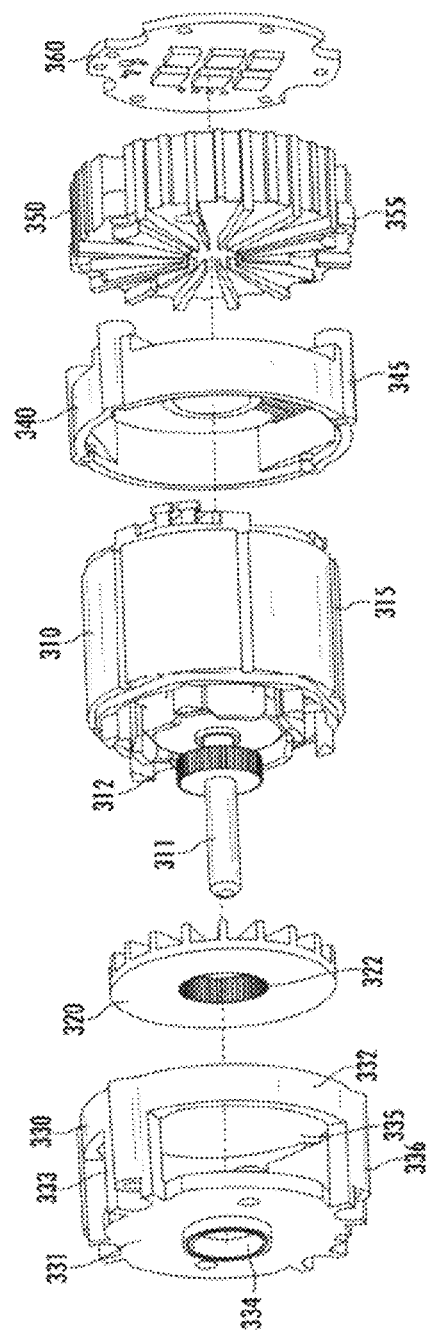
FIG. 8 shows an electric motor assembly according to an embodiment of the present disclosure.

FIG. 8 shows the electric motor assembly 300 according to an embodiment of the present disclosure. The electric motor assembly 300 comprises an electric motor 310, a fan 320, a front mounting frame 330, a rear mounting frame 340, and a control unit 360. The electric motor 310 can be a battery-powered brushless DC electric motor or brushed DC electric motor. The fan 320 is arranged at a front end of the electric motor 310 and driven by the electric motor 310. A gear 312 is mounted on an output shaft 311 of the electric motor 310 and meshed with teeth 322 formed on a wall of a center hole of the fan 320. In other embodiments, the fan 320 may be fixed to the output shaft 311 to rotate together with the output shaft 311. The fan 320 is used to generate a cooling air flow to accelerate heat dissipation of the electric motor 310, and the fan 320 can be a centrifugal fan. The front mounting frame 330 and the rear mounting frame 340 are located at two ends of the electric motor 310, and respectively hold a part of the electric motor 310 to fix the electric motor 310 at a predetermined position. The front mounting frame 330 comprises an end plate 331, an annular electric motor cover part 332, and a plurality of connecting bars 333 connecting the end plate 331 to the electric motor cover part 332. A hole 334 is formed in the end plate 331 to allow the output shaft 311 to pass through. After assembly is completed, the fan 320 is located in the front mounting frame 330. Due to obstruction of the end plate 331, the air flow generated during rotation of the fan 320 can only flow radially outward out of the front mounting frame 330 via a side opening 335 between adjacent connecting bars 333. Thus, the front mounting frame 330 can guide the cooling air flow to flow in a desired path.

In the embodiment shown in FIG. 8, the control unit 360 is arranged at a rear end of the electric motor 310 to control rotation of the electric motor 310. The control unit 360 comprises a circuit board, and an electronic component can be mounted on one side or two sides of the circuit board. The control unit 360 can start/stop the electric motor 310 on the basis of an input of the user, or change the rotation speed of the electric motor 310. The control unit 360 can also determine, on the basis of operating parameters such as a current value and a voltage value of the electric motor 310, whether or not the electric motor 310 operates normally, and stop the electric motor 310 when an abnormality is found. In other embodiments, a sensor used to detect pump parameters may be arranged in the fluid transfer pump, such as a pressure sensor, a temperature sensor, and a liquid sensor. The control unit 360 can control the electric motor 310 on the basis of the pump parameters detected by the sensor. When the pump parameters reach preset values, the control unit automatically controls the electric motor 310.

In one embodiment, a protective shell 350 is provided for the control unit 360. The control unit 360 is located at a rear end of the protective shell 350 or in the protective shell. The protective shell 350 can fulfil heat dissipation of the control unit 360. As shown in FIG. 8, the protective shell 350 is connected to the rear mounting frame 340. Optionally, the control unit 360 is provided with a heat dissipation element or a heat conduction element to conduct heat to the protective shell 350 or ambient air. The heat dissipation element can be a metal radiator in contact with the circuit board and/or the electronic component, or a heat conductive adhesive used to fix the circuit board to the protective shell 350. In some embodiments, the heat conductive adhesive basically fills an internal space of the protective shell 350, and the control unit 360 is at least partially embedded into the heat conductive adhesive. Therefore, the control unit 360 is both fixed and radiated by means of the heat conductive adhesive.

For the sake of convenience for assembly, mounting features can be provided for all components of the electric motor assembly 300. As shown in FIG. 8, first fastener holes 336 are formed in the connecting bars 333 of the front mounting frame 330; grooves 315 extending axially are formed in an outer surface of a stator core of the electric motor 310; second fastener holes 345 are formed in the rear mounting frame 340; and third fastener holes 355 are formed in the protective shell 350 of the control unit 360. The first fastener hole 336, the groove 315, the second fastener hole 345, and the third fastener hole 355 are aligned axially, such that a single fastener 370 (see FIG. 10) can connect the front mounting frame 330, the electric motor 310, the rear mounting frame 340, and the protective shell 350.

Returning to FIG. 2, it shows that the internal space of the housing 100 is divided into a plurality of areas 131, 132, 133 by at least one separator. The electric motor 310 and fan 320 of the electric motor assembly 300 are respectively located in different areas. Specifically, the fan 320 is located at a front side (a left side in the figure) of the electric motor 310, and the fan 320 is located in the first area 131; the electric motor 310 is located in the second area 132; and the first area 131 and the second area 132 are separated by a first partition plate 150. In other embodiments, the fan 320 may be arranged at a rear side of the electric motor 310.

Figure 9:
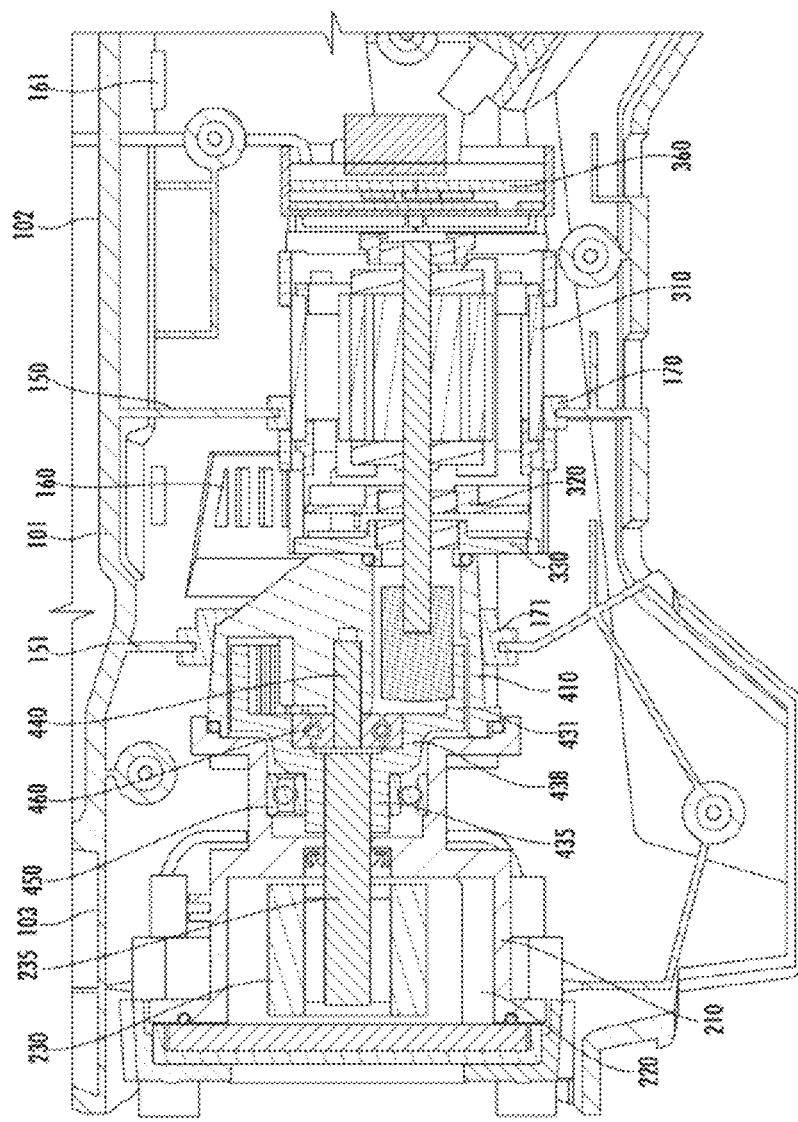
FIG. 9 shows a cross section of the fluid transfer pump.

FIG. 9 shows a cross section of the fluid transfer pump. The first area 131 is at least partially defined by a first wall part 101 of the housing 100, and a first opening 160 is formed in the first wall part 101 such that the first area 131 communicates with an external environment. As described above, the centrifugal fan 320 driven by the electric motor 310 enables the cooling air flow to radially outward flow out of the front mounting frame 330. The air flow flowing out of the front mounting frame 330 enters the first area 131 of the housing 100. Due to obstruction of the first partition plate 150, the air flow cannot enter the second area 132 where the electric motor 310 is located. Therefore, the air flow in the first area 131 flows out of the housing 100 via the first opening 160. Preferably, the first opening 160 is radially aligned to the fan 320 such that the air flow flows out of the housing 100 along the shortest path and takes away heat generated by the electric motor 310 during operation. The first opening 160 serves as an outlet for the cooling air flow.

The second area 132 is at least partially defined by a second wall part 102 of the housing 100, and a second opening 161 is formed in the second wall part 102 such that the second area 132 communicates with the external environment. The electric motor 310 and the control unit 360 located at the rear end of the electric motor 310 are arranged in the second area. In this embodiment, the second opening 161 serves as an inlet for the cooling air flow to introduce air from the external environment. Due to the obstruction of the first partition plate 150, the cooling air flow passes through the electric motor 310 under a suction effect of the fan 320, so as to realize cooling. The cooling air flow heated by the heat generated by the electric motor 310 flows out of the housing 100 via the first opening 160, and thus cannot flow back into the electric motor 310. The second opening 161 can be formed above the electric motor 310 as shown in FIG. 9, or be formed at other positions close to the electric motor 310. In addition, the cooling air entering the second area 132 via the second opening 161 can also cool the control unit 360 adjacent to the electric motor 310.

The third area 133 is at least partially defined by a third wall part 103 of the housing 100. The third area 133 and the first area 131 are separated by a second partition plate 151, and the pump unit 200 is located in the third area 133. Due to obstruction of the second partition plate 151, the heated cooling air flow cannot enter the third area 133.

As shown in FIG. 9, the first partition plate 150 extends from an inner wall of the housing 100 to an outer surface of the electric motor 310, and the second partition plate 151 extends from the inner wall of the housing 100 to an outer surface of the gearbox shell 410. In order to improve sealing performance, a first sealing ring 170 can be arranged between the first partition plate 150 and the outer surface of the electric motor 310, and a second sealing ring 171 can be arranged between the second partition plate 151 and the outer surface of the gearbox shell 410.

Figure 10:
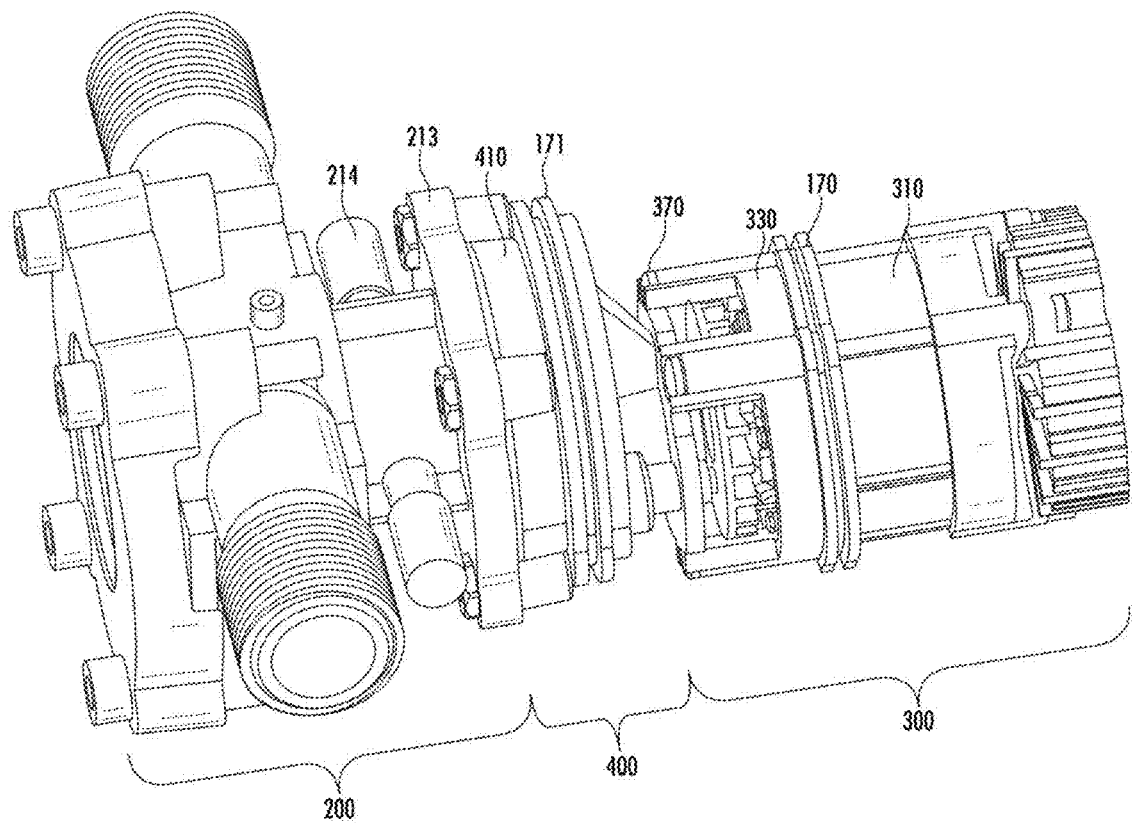
FIG. 10 shows the pump unit, the electric motor assembly, and the speed change mechanism which are in an assembled state.

FIG. 10 shows the pump unit 200, the electric motor assembly 300, and the speed change mechanism 400 which are in an assembled state. The first sealing ring 170 is disposed around the electric motor 310 and abuts against the front mounting frame 330. The second sealing ring 171 is disposed around the gearbox shell 410. Grooves are formed in the first sealing ring 170 and the second sealing ring 171 to achieve a close fit between the first sealing ring and the first partition plate 150 and between the second sealing ring and the second partition plate. The first partition plate 150 and the second partition plate 151 can be integrated with the housing 100 or mounted on the housing 100 as independent separators. In addition, FIG. 10 also shows a positioning component 214. The positioning component is arranged between the pump unit 200 and the housing 100 of the fluid transfer pump to hold the pump unit 200 at a predetermined position in the housing 100. The positioning component 214 can be made from rubber or other materials with damping characteristics to reduce the vibration of the housing 100 during operation of the pump unit 200 for noise reduction.

Figure 11:
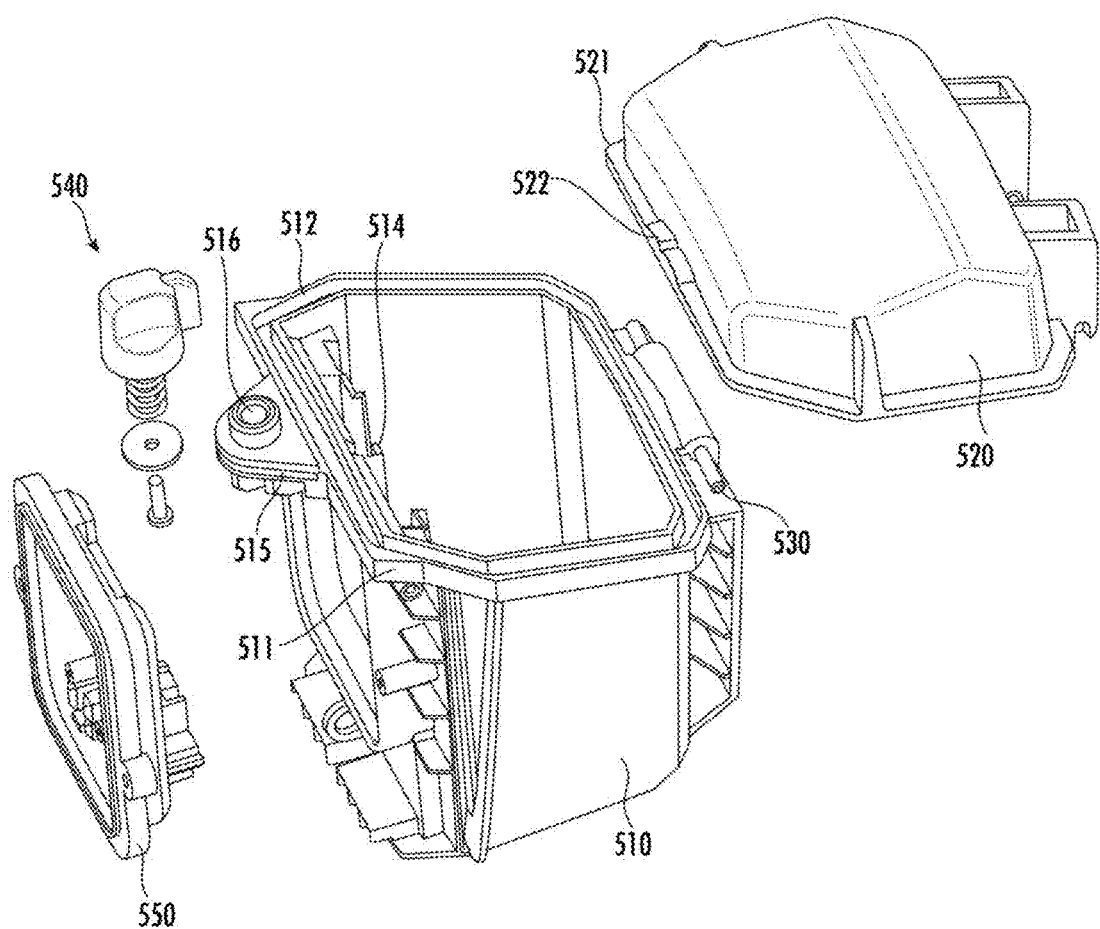
FIG. 11 shows a power supply compartment according to an embodiment of the present disclosure.

FIG. 11 shows the power supply compartment 500 according to one embodiment of the present disclosure. The power supply compartment 500 comprises a compartment shell 510 and a cover 520 covering the compartment shell 510. The cover 520 is pivotally connected to the compartment shell 510 around a pin 530. Optionally, a torsion spring is arranged on the pin 530 to bias the cover 520 to a closed position or a fully open position. In order to prevent the fluid from entering the power supply compartment 500 and making contact with the power supply and the power supply mounting base 550, the power supply compartment 500 is preferably designed to be waterproof. In this embodiment, the cover 520 has a first sealing edge 521, and the compartment shell 510 has a second sealing edge 511. When the cover 520 is in the closed position, the first sealing edge 521 is aligned to the second sealing edge 511.

Figure 12:
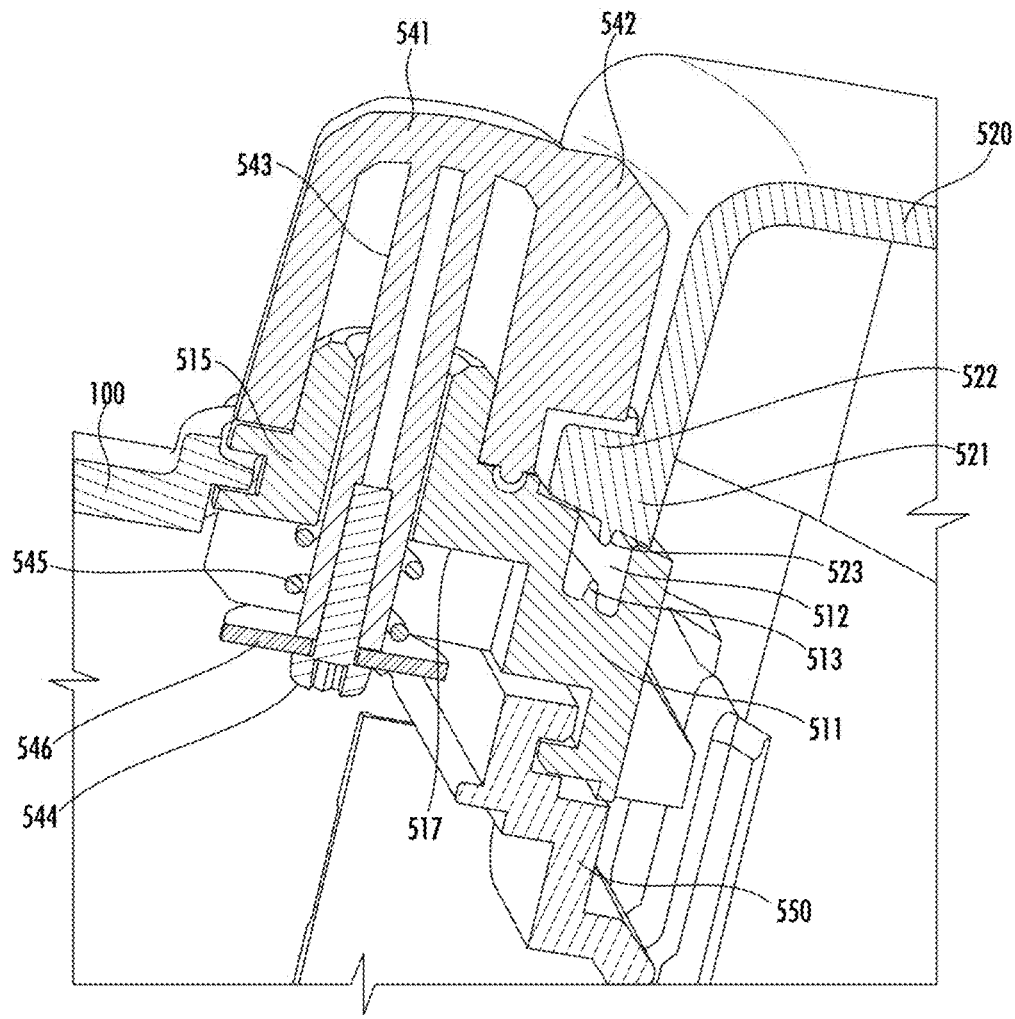
FIG. 12 shows a cross section of a part of the power supply compartment.

FIG. 12 shows a cross section of a part of the power supply compartment 500. To achieve sealing, a groove 512 is formed in the second sealing edge 511; and the groove 512 is used to accommodate a sealing component (not shown in the figure), such as an elastic sealing ring. In other embodiments, the groove used to accommodate the sealing component may be formed in the first sealing edge 521 or formed by both the first sealing edge 521 and the second sealing edge 511. At least one of the first sealing edge 521 and the second sealing edge 511 can have a ridge part 523, 513 extending outward. When the cover 520 is in the closed position, the ridge part 523, 513 abuts against the sealing component to hold the sealing component at a sealing position.

FIG. 11 also shows the power supply mounting base 550 and a locking component 540. The power supply mounting base 550 is arranged on a side of the power supply compartment 500 that is close to the electric motor assembly 300. The power supply mounting base 550 comprises a positioning part used to fix a battery and a contact part electrically connected to the battery. In this embodiment, the power supply mounting base 550 is formed as a part of an inner wall of the power supply compartment 500, guide rails 514 used to guide the battery are formed on the compartment shell 510, and the guide rails 514 are located on two sides of the power supply mounting base 550.

The locking component 540 is used to lock the cover 520 in the closed position. The locking component 540 is able to move between a locked position and an unlocked position under operation performed by the user. When the locking component is in the locked position, at least one part of the locking component 540 presses against the first sealing edge 521 of the cover 520 to prevent the cover 520 from leaving the closed position. The compartment shell 510 comprises a protrusion part 515 extending from the second sealing edge 511, and the locking component 540 is arranged on the protrusion part 515. In the embodiments shown in FIG. 11 and FIG. 12, the locking component 540 is formed as a locking knob 541 which has a locking part 542. The first sealing edge 521 of the cover 520 is provided with a protrusive locking fitting part 522, and a groove for accommodating the locking part 542 can be formed in the locking fitting part 522. When the user turns the locking knob 541 toward the locked position, the locking knob 541 is obstructed by the locking fitting part 522. The user needs to apply a certain force to move the locking knob 541 onto the locking fitting part 522 until the locking part 542 enters the groove in the locking fitting part 522. When the user operates the locking knob 541, force feedback perceived by the user can assist the user in confirming whether or not the locking knob 541 is in the correct locked position.

The locking knob 541 shown in FIG. 12 is in the locked position. The locking knob 541 comprises a rod 543 which extends downward, and the rod 543 penetrates through a through hole 516 formed in the protrusion part 515 of the cover 520. The rod 543 is connected to a fastener 544. The fastener 544 can be a screw engaged with a threaded hole formed in a tail end of the rod 543. A baffle plate 546 is arranged between a head part of the fastener 544 and the tail end of the rod 543. A biasing component 545 such as a spring is arranged between the baffle plate 546 and a bottom surface 517 of the protrusion part 515. When the locking knob 541 is in the unlocked position, the biasing component 545 applies a biasing force to the baffle plate 546 to pull the locking component 540 downward, such that the locking knob 541 is held on the protrusion part 515. When the user turns the locking knob 541 to the locked position, the locking knob 541 can be lifted by the locking fitting part 522 at the first sealing edge 521, such that the baffle plate 546 moves upward. At this time, the distance between the baffle plate 546 and the bottom surface 517 of the protrusion part 515 becomes smaller, such that the biasing component 545 between them is compressed. The biasing component 545 under compression applies a higher biasing force to the baffle plate 546 to resist upward movement of the locking knob 541; and in this way, the locking knob 541 is prevented from falling out of the protrusion part 515.

Figure 13:
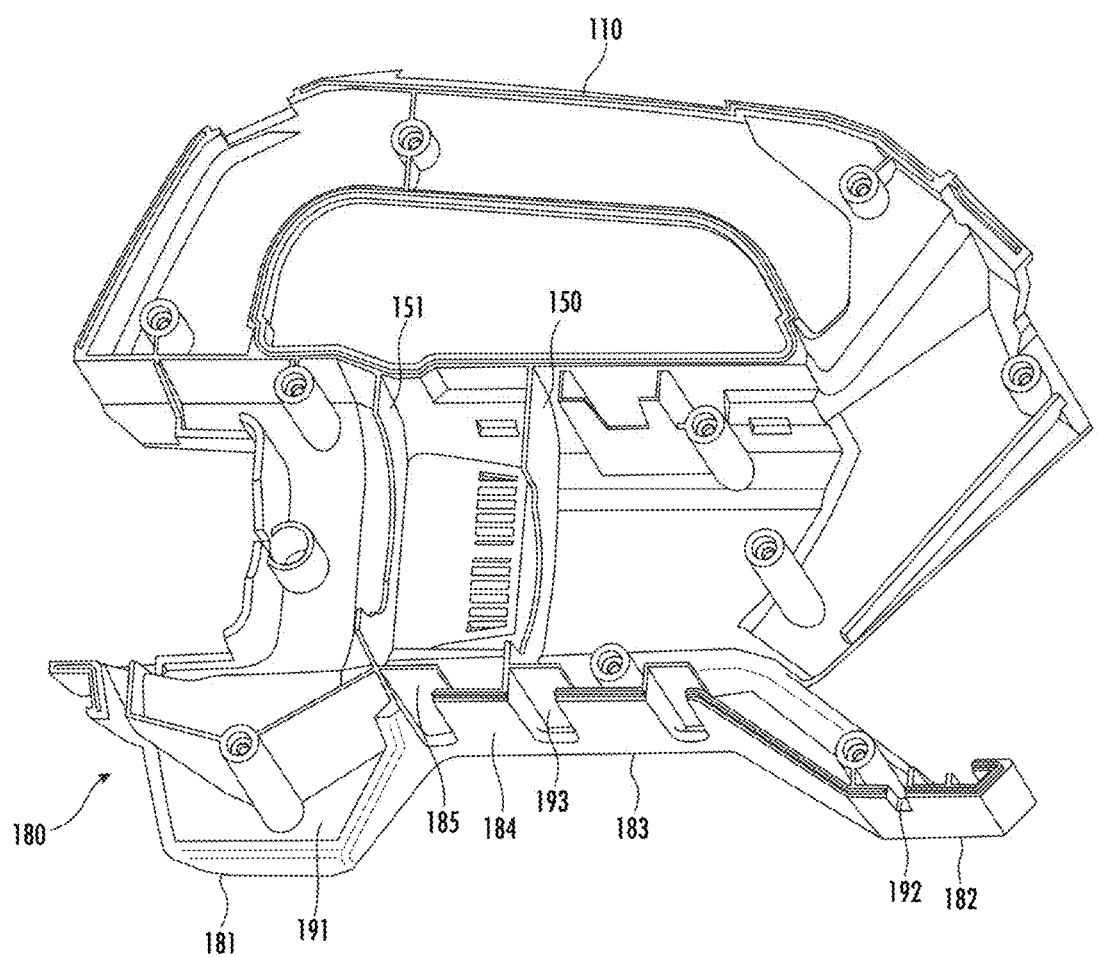
FIG. 13 shows a half housing of the fluid transfer pump.

FIG. 13 shows one of the half housings assembled to form the housing 100. An upper part of the half housing is formed as the handle 110, and a lower part of the half housing is formed as the base 180. The base 180 has a front support part 181 and a rear support part 182, and bottom surfaces of the front support part and the rear support part make contact with the ground or other supporting surfaces. The base 180 further comprises an elevation part 183 which is elevated relative to the bottom surfaces of the front support part 181 and the rear support part 182. In an embodiment, the front support part 181 is roughly located below the pump unit 200; the rear support part 182 is roughly located below the power supply compartment 500; and the elevation part 183 is roughly located below the electric motor assembly 300.

In some cases, the liquid may unexpectedly enter the housing 100. For example, during operation on rainy days, rainwater may enter the housing 100 via the first opening 160 and the second opening 161 in the housing. To avoid accumulation of the liquid in the housing 100, at least one of the support parts 181, 182 and the elevation part 183 can be provided with a hole 191, 192, 193 that enables the internal space of the housing 100 to communicate with the external environment. When the pump unit 200 leaks, the hole 191 in the front support part 181 allows leaked liquid to flow out of the housing 100. The elevation part 183 is a certain distance away from the ground, so as to reduce the possibility of water or debris on the ground entering the first area 131 and the second area 132, thereby protecting the electric motor assembly 300. In this embodiment, the elevation part 183 comprises a bottom wall 184 and a baffle plate 185 located on an inner side of the bottom wall 184, the hole 193 is formed in the bottom wall, and a tortuous path from the hole 193 to the internal space of the housing is defined by the baffle plate 185. During operation of the fluid transfer pump, cooling air can enter the second area 132 via the hole 193 or exit from the first area 131 via the hole 193, and the baffle plate 185 can prevent the litter from entering the housing via the hole 193.

Although the present disclosure has been described in detail in combination with limited embodiments, it should be understood that the present disclosure is not limited to these disclosed embodiments. A person of ordinary skill in the art may contemplate other implementations which conform to the spirit and scope of the present disclosure, including changes in number, modifications, substitutions, or equivalent arrangements of components, and all of these implementations fall within the scope of the present disclosure.

The invention claimed is:

1. A fluid transfer pump, comprising:
a housing, wherein an internal space of the housing is divided into a plurality of areas;
a pump unit comprising an impeller, the impeller rotatable about an impeller axis;
an electric motor assembly comprising an electric motor and a fan, wherein the electric motor and the fan are disposed in different areas of the plurality of areas;
a speed change mechanism arranged between the pump unit and the electric motor assembly; and
a power supply compartment configured to receive a removable power supply,
wherein the pump unit, the speed change mechanism, the electric motor assembly, and the power supply compartment are successively arrayed in an extension direction of the impeller axis.

2. The fluid transfer pump of claim 1, wherein the power supply compartment defines a mounting direction, and wherein the mounting direction is inclined at an angle relative to the impeller axis.

3. The fluid transfer pump of claim 2, wherein the removable power supply is guidable into the power supply compartment in the mounting direction.

4. The fluid transfer pump of claim 2, wherein the angle is 15 degrees to 75 degrees.

5. The fluid transfer pump of claim 1, further comprising a power supply mounting base disposed in the power supply compartment.

6. The fluid transfer pump of claim 1, wherein the pump unit and the power supply compartment are disposed on opposite sides of the housing.

7. The fluid transfer pump of claim 1, wherein the different areas are divided by a first partition plate.

8. The fluid transfer pump of claim 1, wherein the plurality of areas comprise a first area, a second area, and a third area, wherein the first area and second area are separated by a first partition plate, and wherein the first area and third area are separated by a second partition plate.

9. The fluid transfer pump of claim 8, wherein the fan is disposed in the first area, the electric motor is disposed in the second area, and the pump unit is disposed in the third area.

10. The fluid transfer pump of claim 1, wherein the power supply compartment comprises a compartment shell and a cover pivotally connected to the compartment shell, the cover has a first sealing edge, and the compartment shell has a second sealing edge aligned to the first sealing edge; and wherein a groove used to accommodate at least one part of a sealing component is formed in at least one of the first sealing edge and the second sealing edge.

11. A fluid transfer pump, comprising:
a housing;
a pump unit comprising an impeller, the impeller rotatable about an impeller axis;
an electric motor assembly;
a speed change mechanism arranged between the pump unit and the electric motor assembly; and a removably mountable power supply, the removably mountable power supply comprising a battery, wherein the pump unit, the speed change mechanism, the electric motor assembly, and the removably mountable power supply when mounted are successively arrayed in an extension direction of the impeller axis.

12. The fluid transfer pump of claim 11, wherein the removably mountable power supply is guidable into a power supply compartment in a mounting direction, and wherein the mounting direction is inclined at an angle relative to the impeller axis.

13. The fluid transfer pump of claim 12, wherein the angle is 15 degrees to 75 degrees.

14. The fluid transfer pump of claim 11, further comprising a power supply mounting base, wherein the removably mountable power supply is removably mountable to the power supply mounting base.

15. The fluid transfer pump of claim 11, wherein the pump unit and the removably mountable power supply are disposed on opposite sides of the housing when the removably mountable power supply is mounted.

16. The fluid transfer pump of claim 11, wherein an internal space of the housing is divided into a plurality of areas, wherein the electric motor assembly comprises an electric motor and a fan, and wherein the electric motor and the fan are disposed in different areas of the plurality of areas.

17. The fluid transfer pump of claim 16, wherein the different areas are divided by a first partition plate.

18. The fluid transfer pump of claim 11, wherein an internal space of the housing is divided into a plurality of areas, the plurality of areas comprising a first area, a second area, and a third area, wherein the first area and second area are separated by a first partition plate, and wherein the first area and third area are separated by a second partition plate.

19. The fluid transfer pump of claim 18, wherein the electric motor assembly comprises an electric motor and a fan, wherein the fan is disposed in the first area, the electric motor is disposed in the second area, and the pump unit is disposed in the third area.

20. The fluid transfer pump of claim 11, further comprising a power supply compartment configured to receive the removably mountable power supply; wherein the power supply compartment comprises a compartment shell and a cover pivotally connected to the compartment shell, the cover has a first sealing edge, and the compartment shell has a second sealing edge aligned to the first sealing edge; and wherein a groove used to accommodate at least one part of a sealing component is formed in at least one of the first sealing edge and the second sealing edge.

* * * * *